United States Patent
Rode et al.

(10) Patent No.: US 9,394,577 B2
(45) Date of Patent: *Jul. 19, 2016

(54) INDUCTION HEATING APPARATUS, CARRIERS, AND METHODS FOR HEAT TREATING PARTS

(71) Applicant: Temper Axle Products Corporation, Fonda, NY (US)

(72) Inventors: John E. Rode, Fonda, NY (US); Sean E. Strait, Fort Plain, NY (US)

(73) Assignee: Temper Axle Products Corporation, Fonda, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/726,126

(22) Filed: May 29, 2015

(65) Prior Publication Data

US 2015/0344985 A1 Dec. 3, 2015

Related U.S. Application Data

(63) Continuation of application No. 14/287,983, filed on May 27, 2014, now Pat. No. 9,045,807.

(51) Int. Cl.
| | |
|---|---|
| *H05B 6/14* | (2006.01) |
| *C21D 1/42* | (2006.01) |
| *C21D 1/10* | (2006.01) |
| *H05B 6/10* | (2006.01) |
| *C21D 9/00* | (2006.01) |
| *C21D 1/63* | (2006.01) |

(52) U.S. Cl.
CPC .. *C21D 1/42* (2013.01); *C21D 1/10* (2013.01); *C21D 1/63* (2013.01); *C21D 9/0068* (2013.01); *H05B 6/102* (2013.01); *H05B 6/14* (2013.01)

(58) Field of Classification Search
CPC .................................... C21D 1/10; C21D 1/42
USPC .......................................................... 266/249
See application file for complete search history.

(56) References Cited

U.S. PATENT DOCUMENTS

| | | |
|---|---|---|
| 2,454,039 A | 11/1948 | Cox |
| 2,484,865 A | 10/1949 | Strickland, Jr. |
| 2,493,785 A | 1/1950 | Strickland, Jr. et al. |
| 2,598,694 A | 6/1952 | Herbenar |
| 2,647,199 A * | 7/1953 | Wharff, Jr. ............... C21D 1/42 219/657 |
| 2,657,301 A | 10/1953 | Kincaid et al. |

(Continued)

FOREIGN PATENT DOCUMENTS

GB 502152 3/1939

*Primary Examiner* — Scott Kastler
(74) *Attorney, Agent, or Firm* — Heslin Rothenberg Farley and Mesiti PC

(57) ABSTRACT

An apparatus includes rails for supporting sides of a circumferential peripheral edge of a carrier. A movable ram engages a rearward portion of the carrier. A movable restrainer restrains movement of the ram. A wheel engages a forward portion of the carrier. A controller is operable to control the movable restrainer to restrain movement of the ram with the carrier and at least one metal object disposed adjacent an induction heating device, the wheel to rotate the carrier and the metal object, the induction heating device to induction heat the rotating metal object, and the movable restrainer to disengage the ram so that the wheel pivots away to allow passage of the carrier and the heated metal object into a quench bath. A plurality of metal objects may be arranged in a circular array in the carrier about a diameter generally equal to the diameter of an induction coil.

33 Claims, 18 Drawing Sheets

(56) References Cited

U.S. PATENT DOCUMENTS

| | | |
|---|---|---|
| 2,671,160 A | 3/1954 | Segsworth |
| 2,714,647 A | 8/1955 | Good |
| 2,819,370 A | 1/1958 | Osborn, Jr. |
| 3,051,812 A | 8/1962 | Gschwender |
| 3,143,628 A | 8/1964 | Golden |
| 3,502,310 A | 3/1970 | Coffman |
| 3,601,571 A | 8/1971 | Curcio |
| 3,775,831 A | 12/1973 | Cachat |
| 4,021,274 A | 5/1977 | Chadwick |
| 4,482,793 A * | 11/1984 | Lewis ............... C21D 1/42 219/637 |
| 4,673,785 A | 6/1987 | Damiani |
| 6,963,057 B1 * | 11/2005 | Swanger ............ H05B 6/103 148/567 |
| 9,045,807 B1 | 6/2015 | Rode et al. |
| 2012/0234824 A1 | 9/2012 | Nakatsu et al. |

\* cited by examiner

INDUCTION HEATING APPARATUS, CARRIERS, AND METHODS FOR HEAT TREATING PARTS

CROSS REFERENCE TO RELATED APPLICATION

This patent application is a continuation of U.S patent application Ser. No. 14/287,983, filed May. 27, 2014, entitled "Induction Heating Apparatus, Carriers, and Methods for Heat Treating Parts," which issued on Jun. 2, 2015, as U.S Pat. No. 9,045,807, the entire subject matter of this application being incorporated herein by reference.

FIELD OF THE DISCLOSURE

The present disclosure relates generally to induction heating, and more specifically, to induction heating apparatus, carriers, and methods for hardening metal objects and parts.

BACKGROUND

Induction hardening is a form of heat treatment in which a metal object or part is heated by induction heating and then quenched. The quenched metal undergoes a martensitic transformation, increasing the hardness and brittleness of the part. Generally, induction hardening is used to selectively harden areas of a part or assembly without affecting the properties of the part as a whole.

U.S. Pat. No. 2,454,039, issued to Cox, discloses a high-frequency induction heating apparatus for heating articles, such as gears and the like, for hardening purposes, and has for its object a completely automatic heater wherein the gears or other parts to be heated are moved separately upwardly into a heating position and then heated and discharged from the device. The apparatus includes a supporting structure provided with a horizontal rack or table at the top. In the table are mounted in spaced relation with each other two gear supports by means of which a gear is elevated to heating position with respect to a high frequency heating coil just above the support. Between the work supports on the table are provided supporting means for a stack of untreated gears, together with a pusher slidable on the table for pushing the lowermost gear of the stack onto one or the other of the work supports. Suitable driving motors are provided for the work supports and the pusher, together with automatic control means for causing the gears to be pushed one by one off the bottom of the stack alternately onto the supports where they are heated.

U.S. Pat. No. 3,502,310, issued to Coffman, discloses a hot plate billet heater and method of heating employing a billet heater having elongated hot plates which engage and heat an advancing line of billets at closely controlled temperature conditions, releasing the billets at predetermined intervals and, while released, feeding them forward to deliver a leading heated billet for processing. Means are provided for taking away the heated billets as delivered but at a higher travel speed to cause them to move the greater required distance while the main conveyor means is operating.

There is a need for further induction heating apparatus and methods, and more specifically, to induction heating apparatus, carriers, and methods for hardening metal objects and parts.

SUMMARY

In a first aspect, the present disclosure is directed to an apparatus for induction heating at least one metal object releasably attachable to a carrier in which the carrier has a circumferential peripheral edge and is rotatable about a center axis. The apparatus includes a first rail and a spaced apart second rail for supporting opposite first and second side edge portions of the circumferential peripheral edge of the carrier and guiding movement of the carrier between the rails in a longitudinal direction. An induction heating device is disposed adjacent to the rails. A first actuator comprises a ram engagable with a rearward portion of the circumferential peripheral edge of the carrier disposed between the rails for moving the carrier in the longitudinal direction. A movable restrainer is operable for restraining movement of the ram in the longitudinal direction so that the carrier and the at least one metal object is positionable adjacent to the induction heating device. A second actuator is operably pivotably disposed adjacent to the rails and comprising a wheel engageable with a forward portion of the circumferential peripheral edge of the carrier disposed between the rails to rotate the carrier and the at least one metal object. A controller is operable to control, the movable restrainer to restrain movement of the ram in the longitudinal direction with the carrier and the at least one metal object being disposed adjacent the induction heating device, the second actuator to rotate the wheel to rotate the carrier and the at least one metal object disposed adjacent the induction heating device, the induction heating device to induction heat the rotating at least one metal object, and the movable restrainer to disengage the ram so that the second actuator and wheel pivots away to allow passage of the carrier and the heated at least one metal object in the longitudinal direction into a quench bath.

In a second aspect, the present disclosure provides a method for induction heating at least one metal object releasably attached to a carrier in which the carrier has a circumferential peripheral edge. The method includes supporting opposite side edge portions of the circumferential peripheral edge of the carrier releasably attached to the at least one metal object for movement of the supported carrier and the releasably attached at least one metal object along a longitudinal axis, engaging a ram with a rearward portion of the supported circumferential peripheral edge of the carrier, engaging a movable restrainer to restrain movement of the ram in the longitudinal direction so that the carrier and the at least one metal object is positioned adjacent to a induction heating device, engaging a rotatable wheel with a forward portion of the supported circumferential peripheral edge of the carrier, rotating the wheel to rotate the carrier and the at least one metal object between the rotating wheel and the ram, induction heating the rotating at least one metal object with the induction heating device, and moving the movable restrainer to allow pivoting of the wheel and allow the carrier and heated at least one metal object along the longitudinal axis into a quench bath.

Additional features and advantages are realized through the concepts of the present disclosure. Other embodiments and aspects of the disclosure are described in detail herein and are considered a part of the claims.

BRIEF DESCRIPTION OF THE DRAWINGS

Various aspects of the present disclosure are particularly pointed out and distinctly claimed as examples in the claims at the conclusion of the specification. The foregoing and other objects, features, and advantages of the disclosure are apparent from the following detailed description taken in conjunction with the accompanying drawings in which:

DETAILED DESCRIPTION

Figure 1:
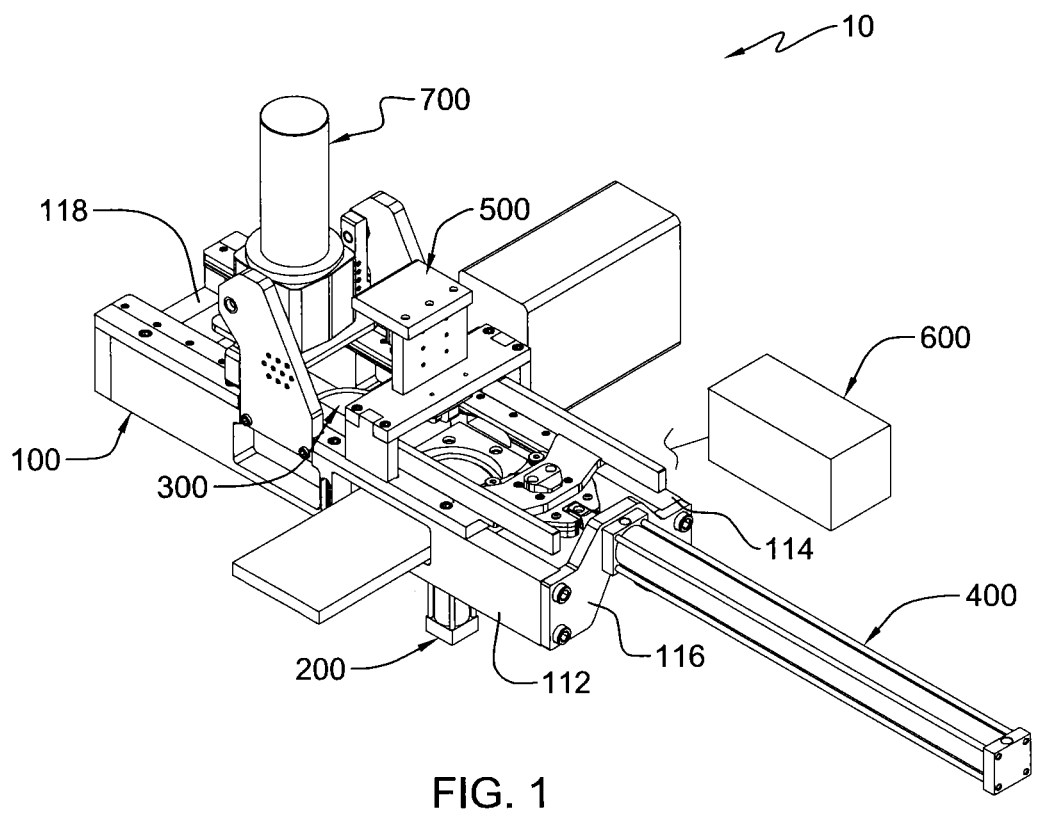
FIG. 1 is a perspective view illustrating an exemplary embodiment of an induction heating apparatus in accordance with aspects of the present disclosure.

FIG. 1 illustrates an exemplary embodiment of an induction heating apparatus 10 in accordance with aspects of the present disclosure. As will be appreciated from the description below, the induction heating apparatus may be operable to relatively quickly heat and quench a plurality of metal objects or parts while employing less energy compared to conventional induction heating and hardening systems. For example, the induction heating apparatus may generally employ a carrier for holding at least one metal object or part, or a carrier for holding a plurality of metal objects or parts which are automatically guided adjacent to an induction heating device, rotated during induction heating, and then once operably heated, automatically ejected into a quench bath. As will be appreciated by the description below, a wide variety of small objects or parts can be accommodated or circularly arranged in a carrier so that surfaces of the small objects or parts may be induction heating simultaneously and faster by a single large coil that is otherwise not suitable or possible to individually induction heat the small objects or parts. This is accomplished by arranging the small objects or parts in a circular array in a carrier for positioning adjacent to the induction heating device. The rotation of the carrier and objects or parts encourages a uniform field for uniform heating of the objects or parts. Such as technique offers the ability to harden dozens of objects or parts in the carrier per each cycle.

Induction heating is a non contact heating process which utilizes the principle of electromagnetic induction to produce heat inside a metal object or in a surface layer of a metal object or work-piece. By placing a conductive material into a strong alternating magnetic field, electrical current can be made to flow in the material thereby creating heat due to the $I^2R$ losses in the material. In magnetic materials, further heat is generated below the Curie point due to hysteresis losses. The current generated flows predominantly in the surface layer, the depth of this layer being dictated by the frequency of the alternating field, the surface power density, the permeability of the material, the heat time and the diameter of the bar or material thickness. By quenching this heated layer in water, oil or a polymer based quench, the surface layer is altered to form a martensitic structure which is harder and more brittle than the base metal.

Figure 2:
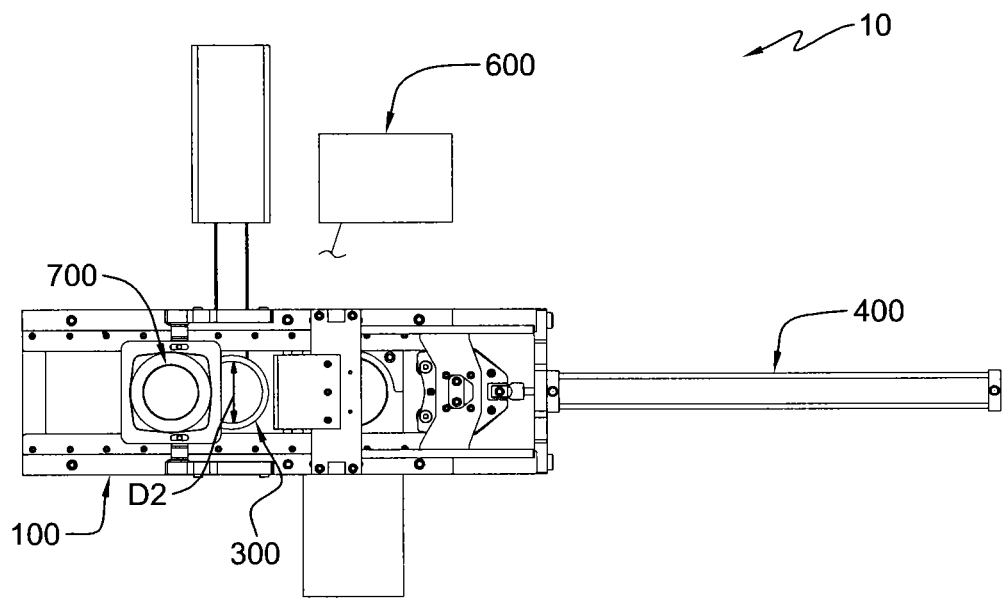
FIG. 2 is a top view of the induction heating apparatus of FIG. 1.
Figure 3:
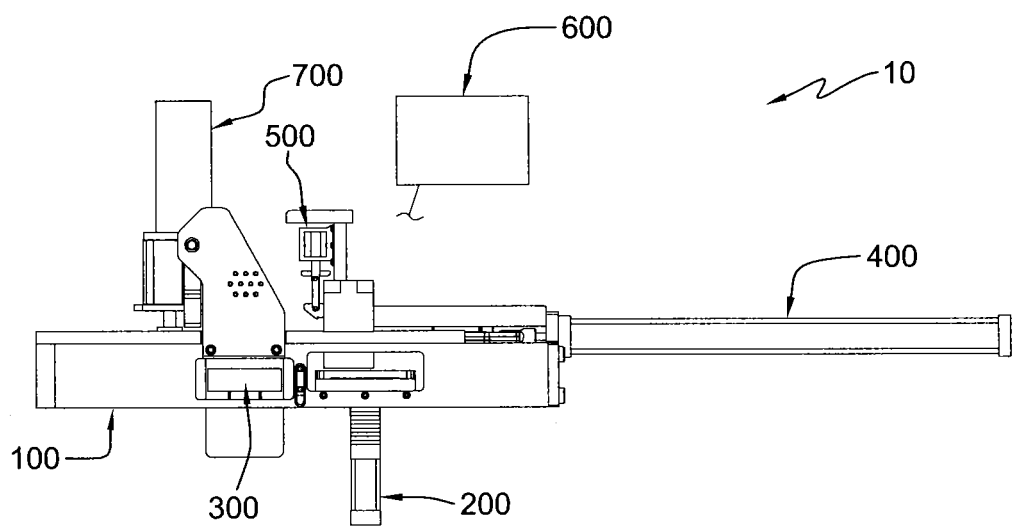
FIG. 3 is a side view of the induction heating apparatus of FIG. 1.

With reference to FIGS. 1-3, in this illustrated embodiment, induction heating apparatus 10 may generally include a support assembly 100 to which is operably attached or disposed an actuator assembly 200 for receiving positioning a carrier and at least one metal object (the carrier and at least one metal object not shown in FIGS. 1-3), an induction heating device 300, a actuator assembly 400 for moving the carrier and part adjacent to induction heating device 300, a movable restrainer assembly 500 (best shown in FIG. 3), a controller 600, and an actuator assembly 700 for rotating the carrier and at least one metal object during the induction heating process. As will be described below, actuator assembly 400 is also operable, once the induction heating is completed, to rapidly force and move the carrier and at least one heated object or part toward a quench bath (not shown in FIG. 1) disposed adjacent to the end of the support assembly 100.

Figure 4:
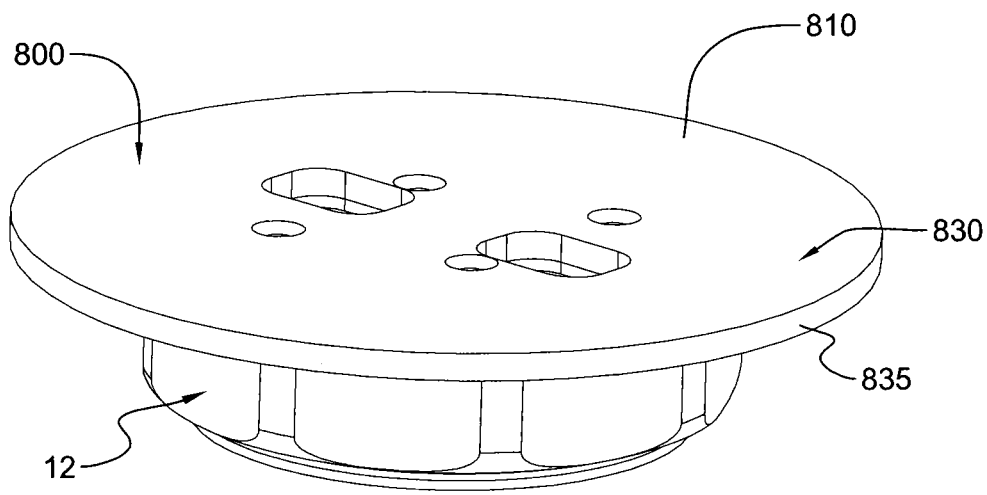
FIG. 4 is a top perspective view of a carrier operable for releasably holding a metal object or part for induction heat treating using the induction heating apparatus of FIG. 1.
Figure 5:
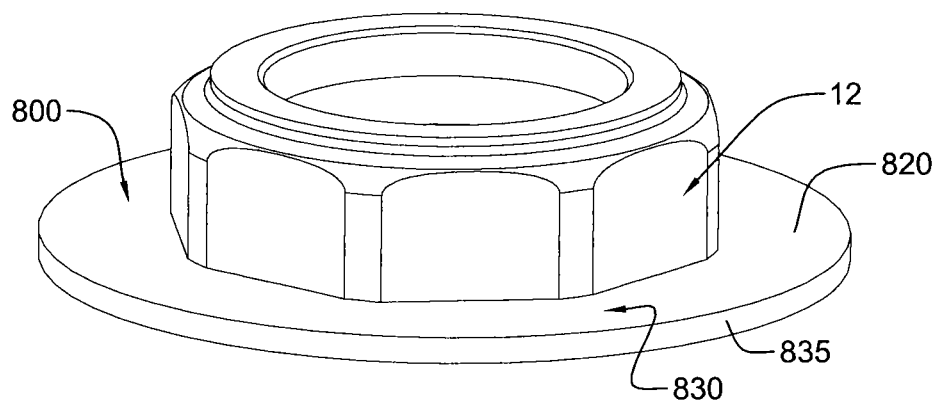
FIG. 5 is a bottom perspective view of the carrier of FIG. 4 operable for releasably holding the metal object.

As shown in FIGS. 4 and 5, one embodiment of a carrier 800 may include a disk shaped member having an upper surface 810 (FIG. 4), a bottom surface 820 (FIG. 5), and a peripheral edge portion 830 having a peripheral edge 835. The bottom of carrier 800 may be operably attached, for example using spring biased members or other fasteners or means, to a single part 12. In some examples, the part 12 may be a nut, such as a nut for setting the bearing adjustment of bearings mounted on a wheel axle.

Figure 6:
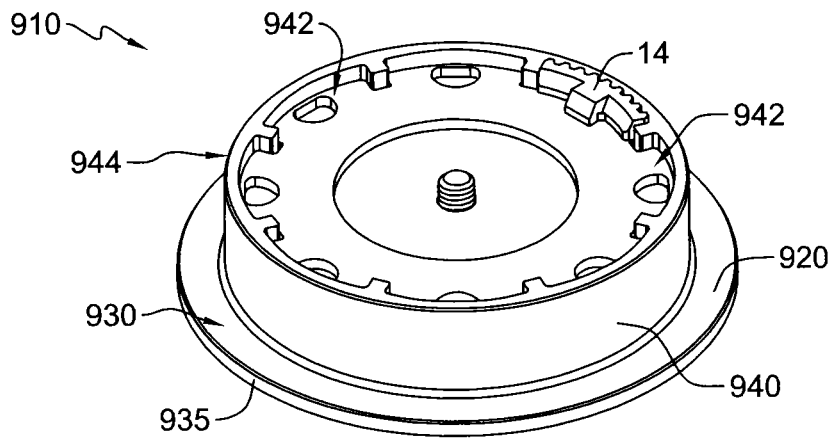
FIG. 6 is a bottom perspective view of another embodiment of a carrier operable for holding a plurality of metal objects or parts, one of which being shown, for induction heat treating using the induction heating apparatus of FIG. 1.
Figure 7:
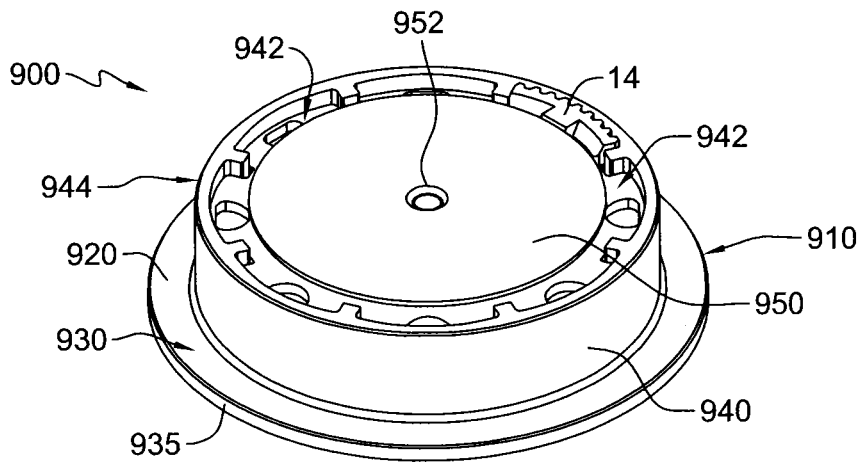
FIG. 7 is a bottom perspective view of the carrier of FIG. 6 along with a retaining plate for securing the plurality of metal objects or parts, one of which being shown.
Figure 8:
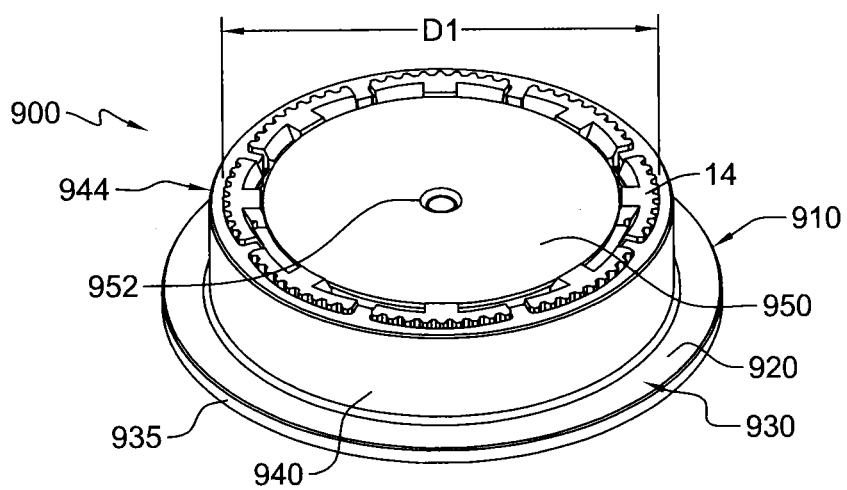
FIG. 8 is a bottom perspective view of the carrier of FIG. 6 along with a retaining plate for securing a plurality of metal objects or parts.

In other embodiments, as shown in FIGS. 6-8, a carrier 900 (FIGS. 7 and 8) may include a generally disc-shaped member 910 and a retaining plate 950 (FIGS. 7 and 8) for releasably restraining a plurality of metal objects or parts 14 to be heat treated, one such metal object or part 14 being show in FIG. 6. Disc-shaped member 910 may include an upper surface (not shown), a bottom surface 920, and a peripheral edge portion 930 having a peripheral edge 935. Disc-shaped member 910 may include a support 940 comprising a plurality of cutouts 942 (FIGS. 6 and 7) for receiving the plurality of metal object or part parts. Cutouts 942 may be arranged and sized and configured for receiving a plurality of metal parts and retaining the plurality of metal parts in a spaced-apart relationship along a peripherally-extending portion 944 of support 940. For example, as best shown in FIG. 8, metal parts 14 may be arranged in a circular pattern or array having a diameter D1. Retaining plate 950 (FIGS. 7 and 8) may be releasably secured to disc-shaped member 910, for example with a bolt extending through a hole 952, to securely restrain the plurality of metal objects or parts 14 to disc-shaped member 910. With reference again to FIG. 2, coil 300 may have a diameter D2. Diameter D1 of support 940 may be generally equal to diameter D2 of the induction coil. Such a configuration of arranging the plurality of relatively small objects or parts in a circular array for positioning in alignment with the coil of the induction coil, and rotation of the plurality of relatively small objects or parts, allows quick, simultaneous, and uniform induction heating of the plurality of relatively small objects or parts. In some examples, the plurality of metal objects or parts 14 may be a plurality of keys used, for example, in securing nut 12 to a wheel axle.

From the present description, it will be appreciated that the heat treating of the metal object or part or plurality of metal objects or parts may only include heat treating a surface of the part or surfaces of the part. The carriers and holder may be reusable for use with induction heating apparatus 10 in heat treating multiple runs of heat treating metal objects or parts. The carrier or portions of the carrier may be formed from stainless steel that may provide for longer life and lower thermal conductivity of the carrier compared to the carrier being formed from steel.

Figure 9:
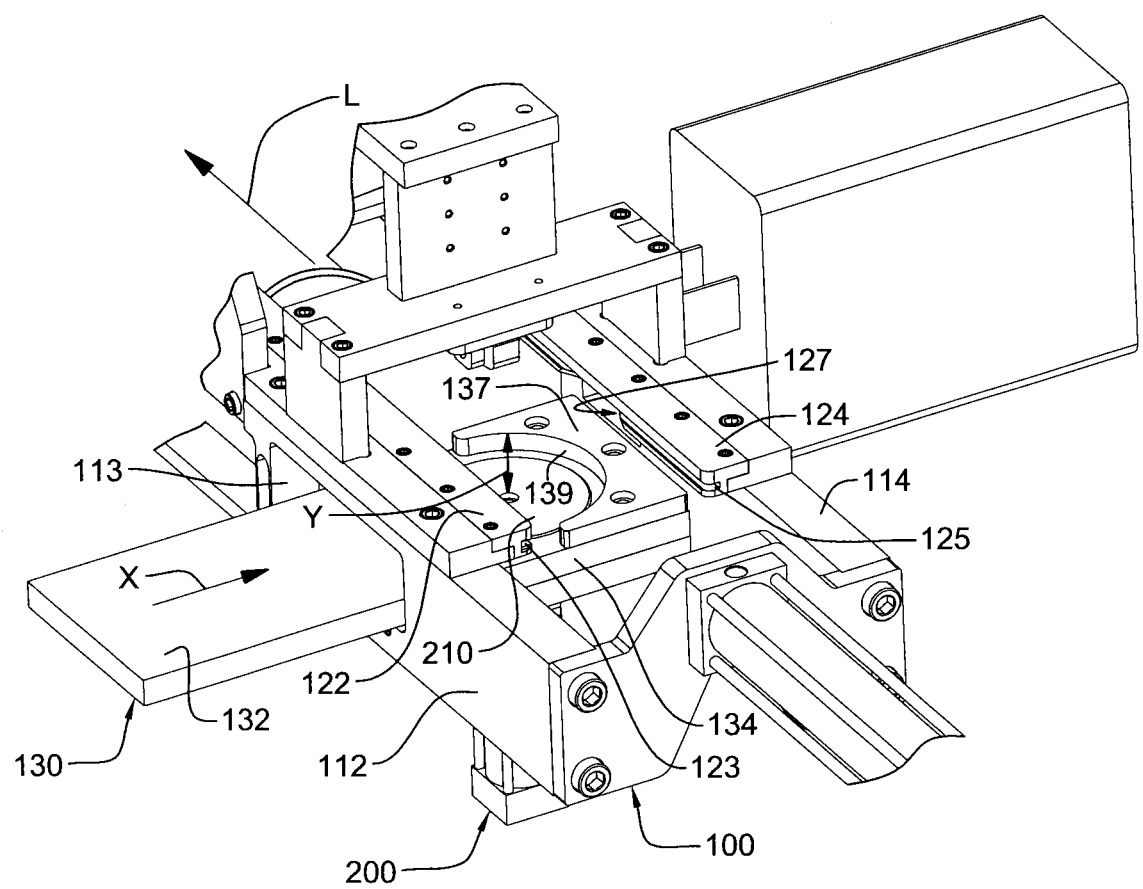
FIG. 9 is an enlarged perspective view of a portion of the induction heating apparatus of FIG. 1 illustrating the rails and support.

With reference again to FIG. 1, support assembly 100 may include a pair of elongated supports 112 and 114 operably spaced apart and attached at one end to a first end support 116, and at the other end by a second end support 118. As best shown in FIG. 9, attached along the top of each of supports 112 and 114 are a rail 122 and a rail 124, respectively. Each of rails 122 and 124 include an elongated groove, a groove 123 in rail 122, and a groove 125 in rail 124. For example, support 112 may be spaced apart and parallel to support 114, rail 123 and may be spaced apart and parallel to rail 124, and groove 123 may be spaced apart, parallel, and facing groove 125. As described below, the rails allow for guiding movement of the carrier and attached metal part from one end portion of the support assembly or rails to the opposite end portion of the support assembly or rails. Curved cutouts opening onto the grooves may be disposed along the bottom of rails 123 and 125, only curved cutout 127 in rail 124 being shown in FIG. 9. The curved cutouts allow the carrier to be received therebetween and aligned with the grooves. Rail 122 and rail 124 are operable for supporting opposite first and second side edge portions of the circumferential peripheral edge of the carrier and for guiding movement of the carrier in the grooves between the rails in a longitudinal direction L from one end portion of support 100 to an opposite end portion of support 100 as described further below.

With reference still to FIG. 9, support 100 may include a planar member 130 that extends through an opening 113 in support 112. Planar member 130 is operable for an operator to initially support a carrier attached to at least one metal object or part on an end portion 132 of planar member 130. An operator may move or feed the carrier attached to at least one metal object or part in the direction of arrow X to an end portion 134 of planar member 130. Attached to planar member 130 at end portion 134 is a restraining member 137 having a curved cutout 139 sized for positioning the peripheral edge of the carrier and positioning the carrier attached to a metal object between supports 112 and 114. While support 100 may include various components having a general planar configuration, it will be appreciated that other a support may comprise components having other configurations and sizes. In addition, instead of planar member 130, a supply chamber or magazine (not shown) may be employed to hold a plurality of carriers and metal parts, and automatically feed the plurality of carriers and metal parts into induction heating apparatus 10.

Actuator 200 may be a vertically disposed pneumatic actuator having a piston rod (not shown in FIG. 9), the upper end of which is operably connected to a circular plate 210. Circular plate 210 may be operably raised and lowered in the directions of doubled headed arrow Y by actuator 200.

Figure 10:
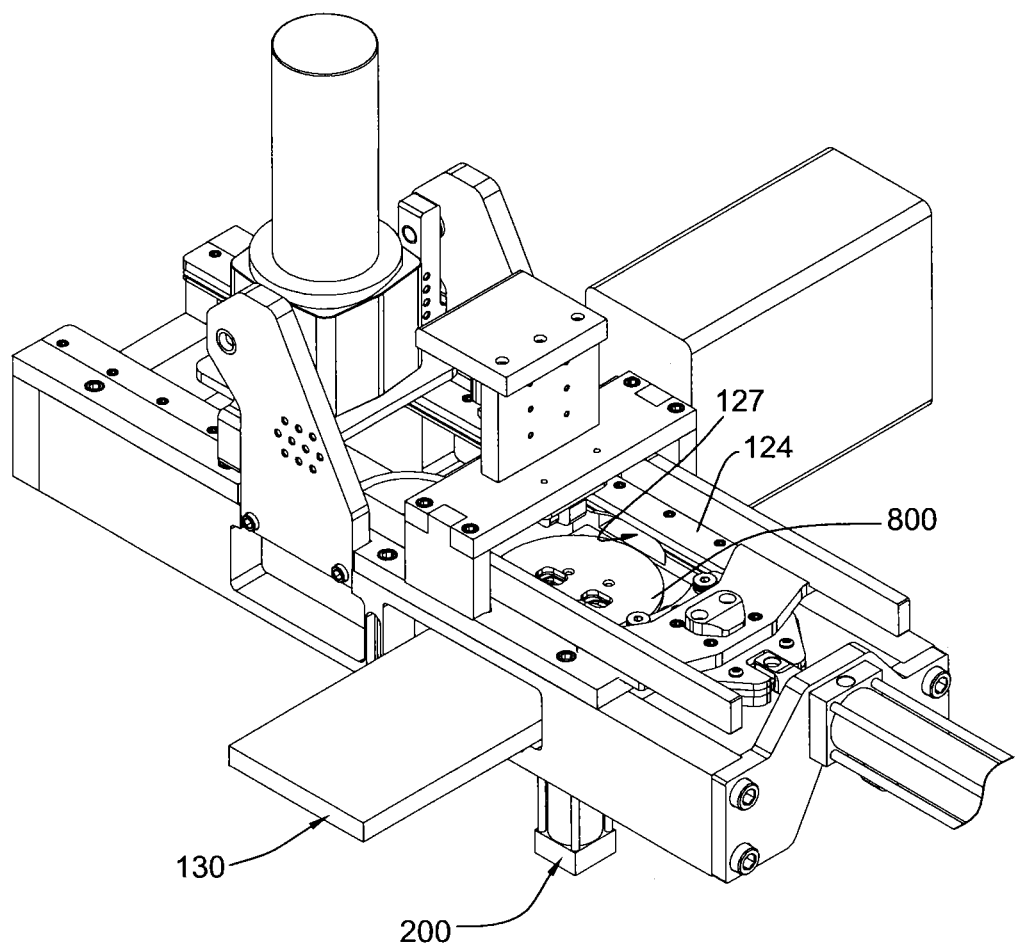
FIG. 10 is an enlarged perspective view of a portion of the induction heating apparatus of FIG. 1 with a carrier and metal object positioned in the induction heating apparatus.

As shown in FIG. 10, carrier 800 attached to a metal part is positioned on circular plate 210 (FIG. 9) attached to actuator 200 so that the peripheral edge of the carrier is aligned below the curved cutouts (only curved cutout 127 being shown in FIG. 10) in the rails (only rail 124 being shown in FIG. 10).

Figure 11:
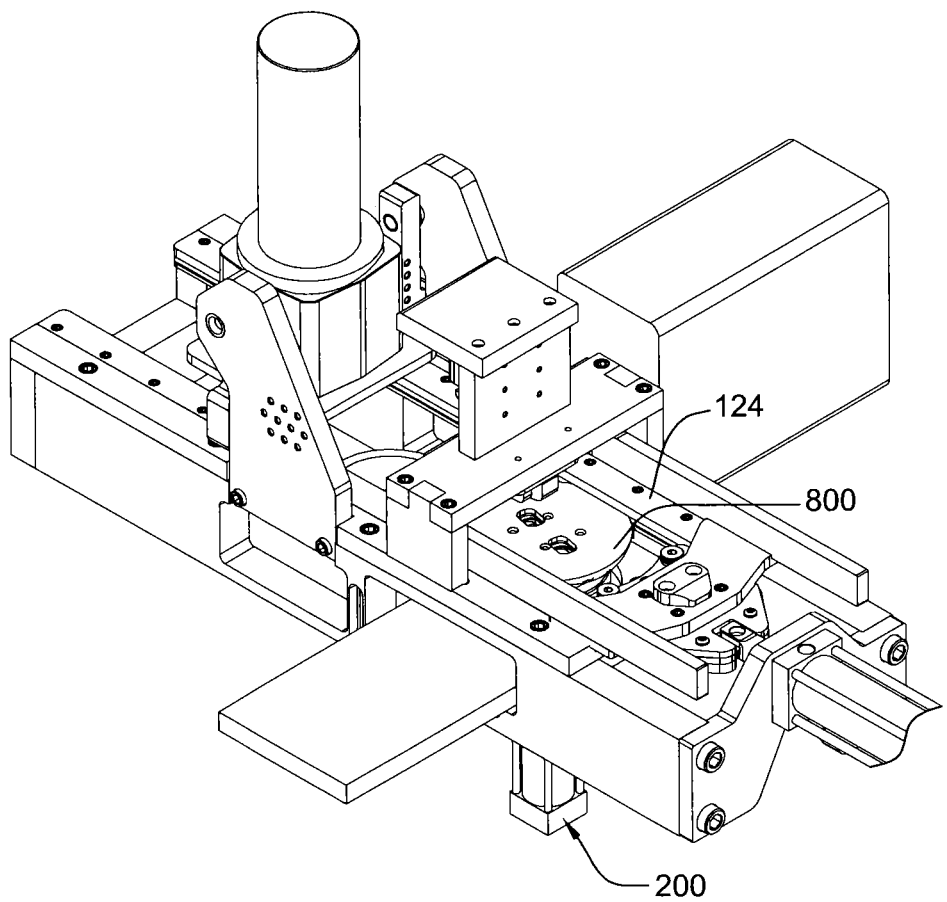
FIG. 11 is an enlarged perspective view of a portion of the induction heating apparatus of FIG. 1 with the carrier and metal object raised and aligned with in the grooves of the guide rails.
Figure 12:
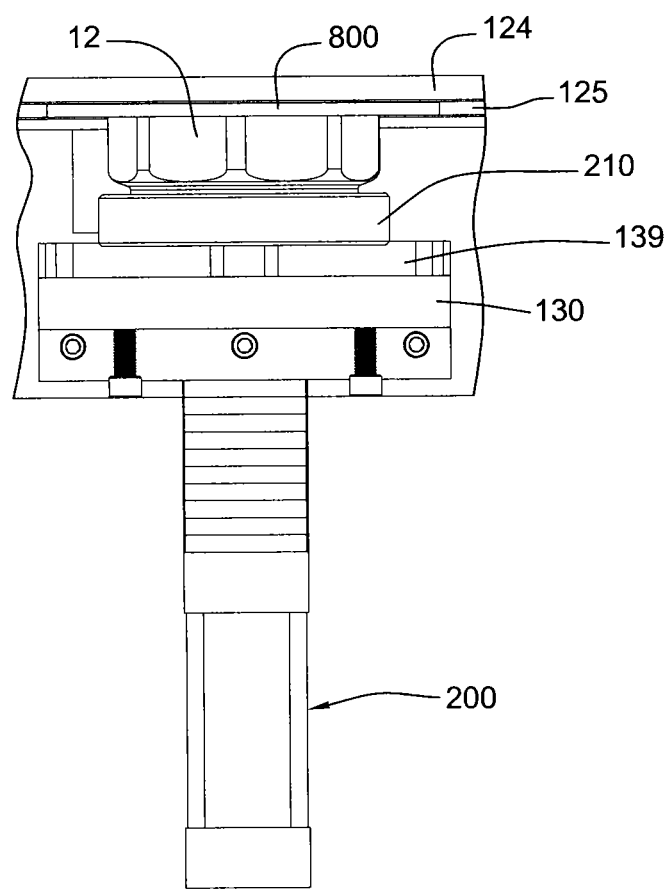
FIG. 12 is a side elevational view of a portion of the induction heating apparatus of FIG. 1 illustrating the actuator for aligning the carrier with the grooves of the rails.

With reference to FIGS. 11 and 12, actuator 200 is activated, for example by controller 600 (FIG. 1) to raise circular plate 210 (FIG. 12), and thus, raise carrier 800 and metal part 12 (FIG. 12) disposed thereon so that the peripheral edge of carrier 800 is disposed in the curved cutouts in the rails (only rail 124 being shown in FIGS. 11 and 12) and the peripheral edge of carrier 800 being aligned with the grooves (groove 125 best shown in FIG. 12) in the rails. For example, actuator 200 may be an air cylinder having a first sensor disposed adjacent the top of the cylinder to detect the position of the piston, which sensor being operably connected to controller 60, allows detecting when the carrier and part are aligned with the grooves.

Figure 13:
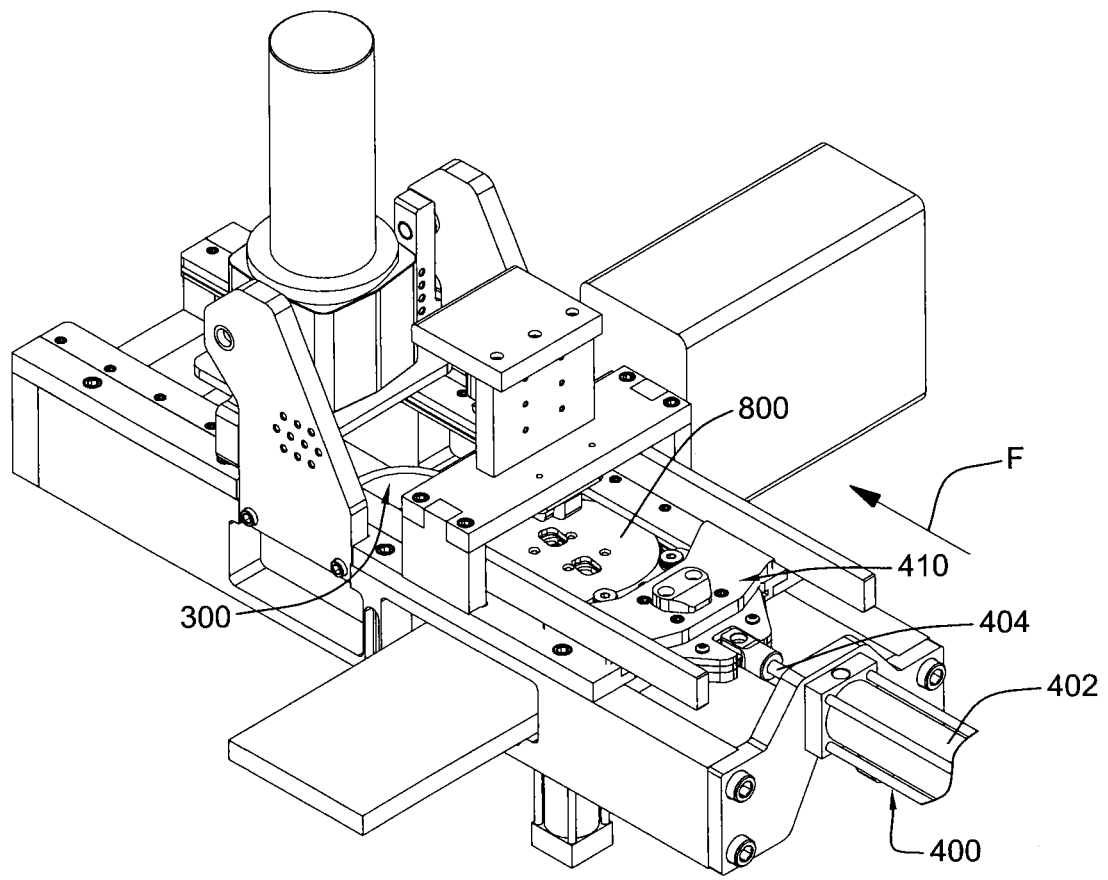
FIG. 13 is an enlarged perspective view of a portion of the induction heating apparatus of FIG. 1 with the ram assembly moved to engage the peripheral edge of the carrier.

With reference to FIG. 13, controller 600 (FIG. 1) upon detection of the carrier being raised and aligned with the grooves, may activate actuator 400 to move a movable ram assembly 410 in the direction of arrow F to engage carrier 800, and thereafter move carrier 800 past the cutouts in the rails so that the peripheral edge of the carrier is restrained between the grooves in the rails. Actuator 400 may include an air cylinder 402 and a piston rod 404. The distal end of piston rod 404 is operably attached to movable ram assembly 410.

Figure 14:
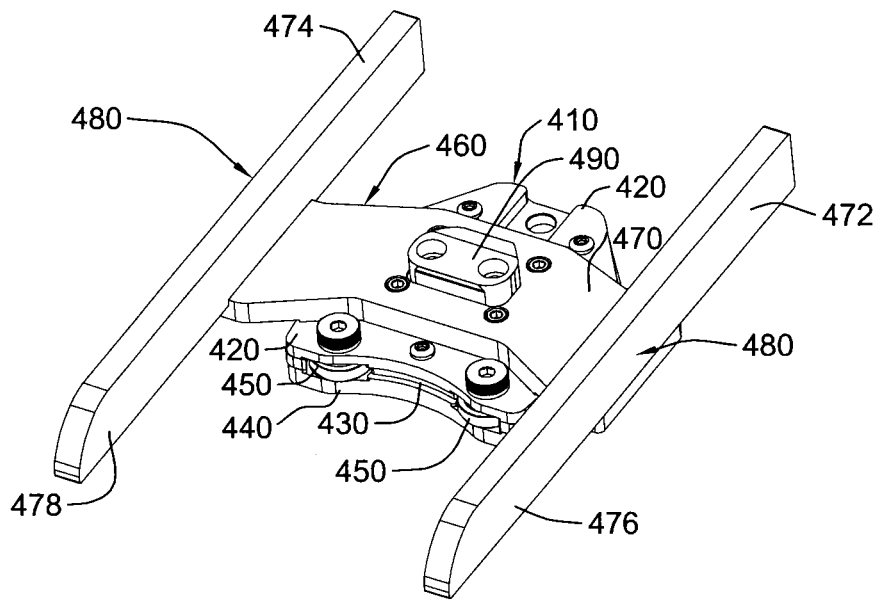
FIGS. 14 and 15 are enlarged perspective views of the ram assembly, pusher assembly, and ram stop of the induction heating apparatus of FIG. 1.
Figure 15:
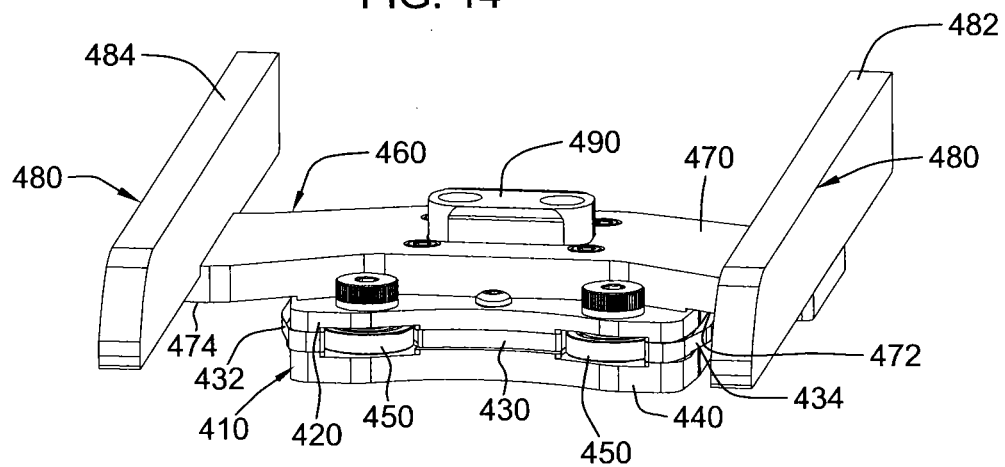

As best shown in FIGS. 14 and 15, movable ram assembly 410 may comprise a top plate 420, a middle plate 430, and a bottom plate 440 operably secured together, such as with bolts. Middle plate 430 may include cutouts for receiving a plurality of rotatable bearings 450, each rotatable bearing operably supported by a bolt extending through top plate 420 and bottom plate 440. Side portions 432 and 434 of middle plate 430 extend laterally outward beyond the side edges of top plate 420 and bottom plate 440. Rotatable bearings 450 are aligned with lateral side portions 432 and 434. Lateral side portions 432 and 434 are sized to be received in and extend into the grooves in the rails of the induction hearing apparatus with rotatable bearings 450 aligned and operable to engage the peripheral edge of the carrier.

Figure 16:
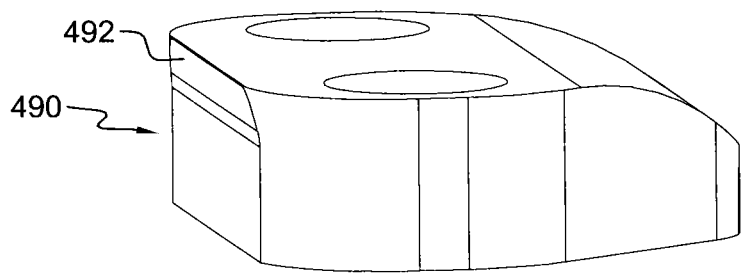
FIG. 16 is an enlarged perspective view of the ram stop of FIGS. 13 and 15.

Ram assembly 410 may include a pusher assembly 460 comprising a base 470 operably attached to pushers 480. Pusher assembly 460 is operable to move actuator 700 (FIG. 1) out of the way when ejecting the carrier and a heated metal part as described in greater detail below. Bottom surfaces 472 (FIGS. 15) and 474 (FIG. 15) of base 470 ride on top of rails 122 and 124 (FIG. 9), respectively. Disposed on an upper surface of base 470 is a ram stop 490. Ram stop 490 may include an upper edge 492 defining a hook or a catch as best shown in FIG. 16.

Figure 17:
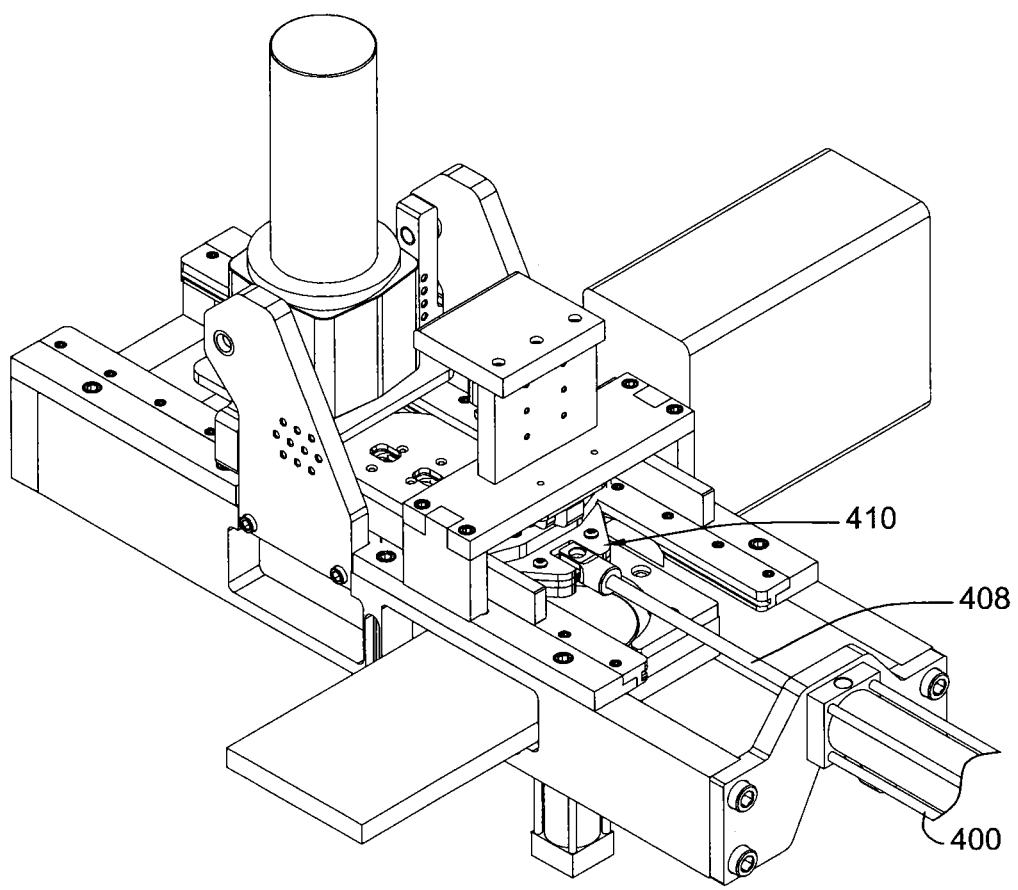
FIG. 17 is an enlarged perspective view of a portion of the induction heating apparatus of FIG. 1 with the carrier and metal object or part positioned over the induction heating device.
Figure 18:
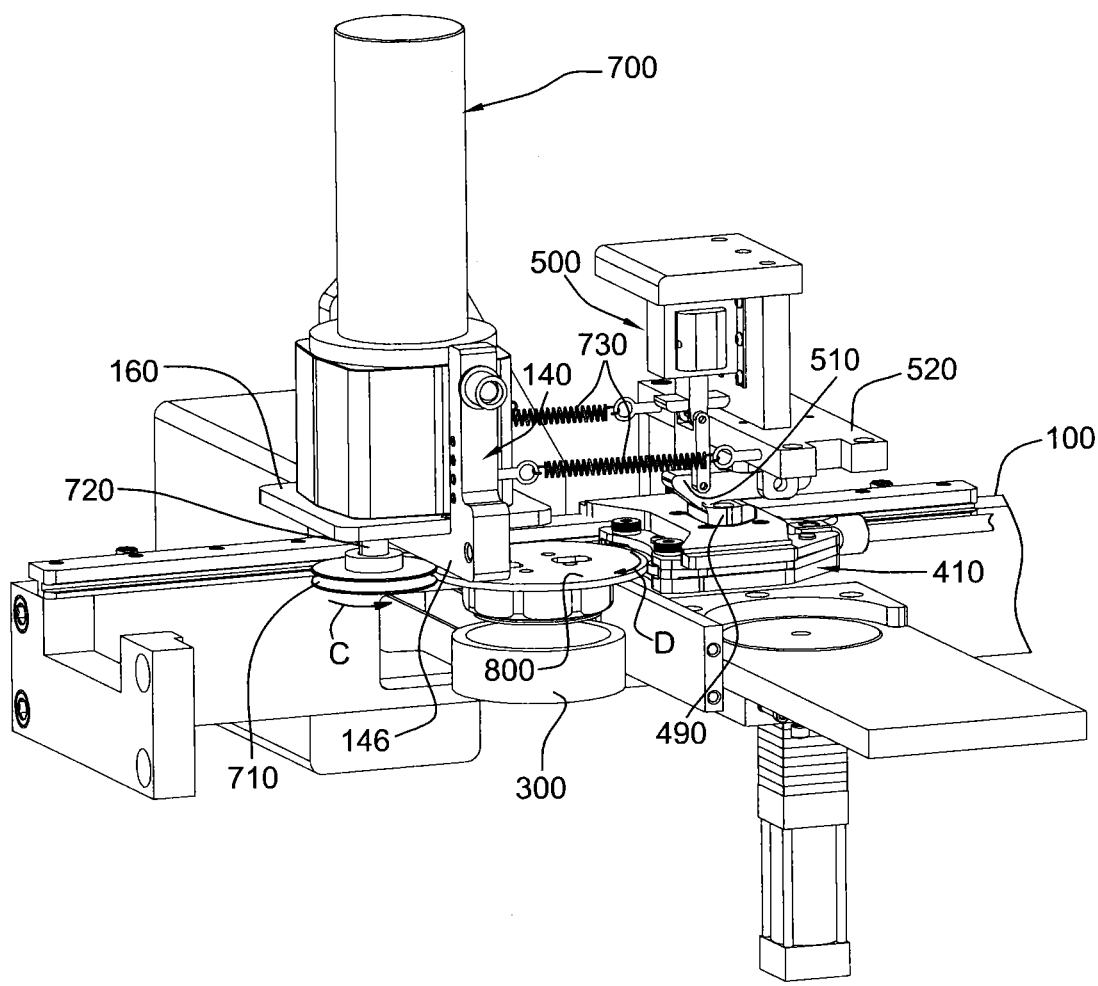
FIG. 18 is an enlarged perspective view, partially cut away, of a portion of the induction heating apparatus of FIG. 1 with the carrier and part positioned over the induction heating device.
Figure 19:
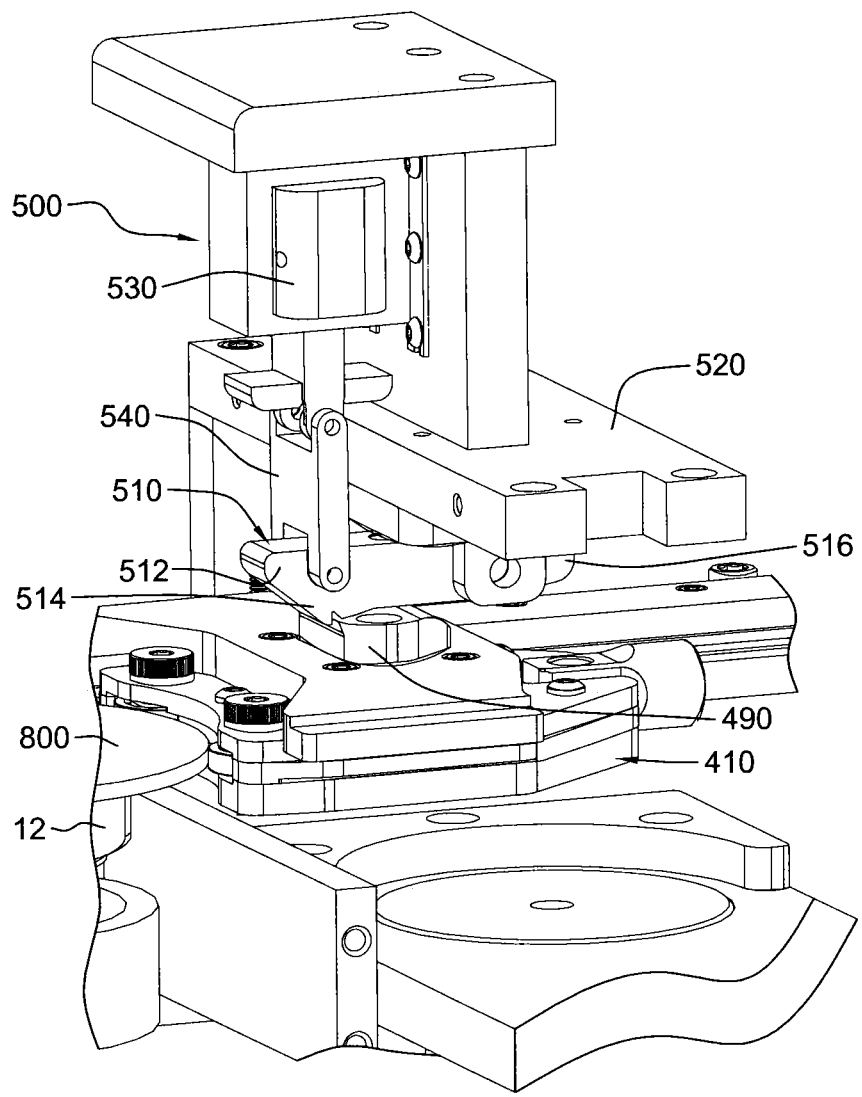
FIG. 19 is an enlarged perspective view, partially cut away, of a portion of the induction heating apparatus of FIG. 1 illustrating the movable restrainer assembly for releasably restraining movement of the carrier during induction heating of the metal part.
Figure 20:
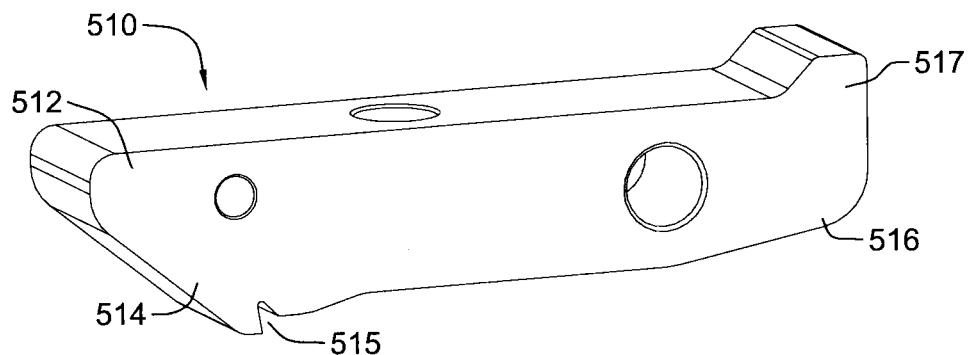
FIG. 20 is an enlarged perspective view of the movable retainer of FIG. 19.

With reference again to FIG. 13, after ram assembly 410 engages the carrier, piston rod 404 of actuator 400 continues to further extend and position the carrier and part over induction heating device 300 (FIG. 18) as shown in FIGS. 17 and 18. As shown in FIG. 19, ram assembly 410 is limited from pushing the carrier and the metal object further past the induction heating device by ram stop 490 engaging a movable restrainer 510 of movable restrainer assembly 500. As best shown in FIG. 20, movable restrainer 510 of movable restrainer assembly 500 may be elongated having a first end 512 having a downwardly depending hook or catch 514 which engages catch 492 (FIG. 16) of ram stop 490, and a second end 516 which is pivotally attached a support 520 (FIG. 19) of movable restrainer assembly 500. As shown in FIG. 20, movable restrainer 510 includes catch 514 and a relief or cutout 515 disposed adjacent to catch 514. End 516 of movable restrainer 510 includes a raised portion 517, the upper portion of which engages the bottom of support 520 to limit the amount that end portion 512 may pivot downwardly.

With reference again to FIG. 19, movable restrainer 510 may be operably connected to a solenoid 530 which activation of the solenoid, via the controller, is operable to move a linkage 540, pivotally attached to movable restrainer 510, to move catch 514 upwardly, via pivoting movable restrainer 510 about the pivoted second end 516 after operable induction heating of the metal object.

With reference again to FIG. 18, actuator 700 such as an electric motor include a motorized wheel 710 which is positioned to engage a front edge of the peripheral edge of the carrier, and via control by the controller, rotate the carrier and part as induction 300 coil is energized. For example, rotation of wheel 710 in the direction of curved arrow C causes carrier 800 to rotate in the opposite direction shown as curved arrow D. As will be appreciated, the peripheral edge of the carrier is supported on the sides by the rails, and inhibited from moving longitudinally along the length of support 100 backwardly by rotatable bearing 450 (FIG. 15) and inhibited from moving forwardly by wheel 710.

Figure 21:
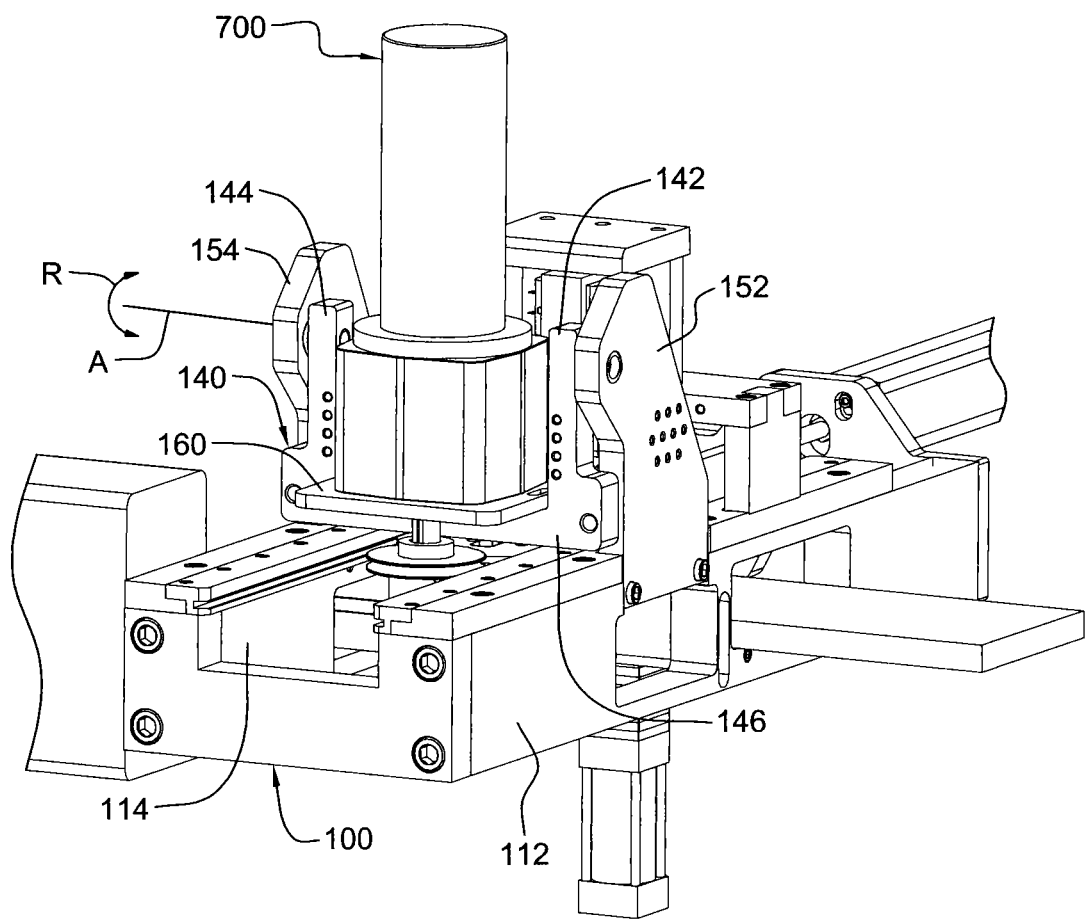
FIG. 21 is an enlarged perspective view of a portion of the induction heating apparatus of FIG. 1 illustrating the pivotal support of the actuator for rotating the carrier and metal object.

As shown in FIG. 21, motor assembly 700 may be pivotally attached to support 110. For example, motor assembly 700 may be attached to a rotatable U-shaped support 140, which rotatable U-shaped member is pivotally attached to arms 152 and 154, which arms are operably attached to support 112 and 114, respectively. Motor assembly 700 is rotatable about an axis A in the direction of double headed arrow R. U-shaped support 140 may include an upwardly-extending first leg 142, a spaced apart upwardly-extending second leg 144, and a horizontally-extending leg 146 connected to the lower ends of first leg 142 and second leg 144. The upper end portions of the upwardly extending legs of the U-shaped support may be operably pivotally attached to arms 152 and 154. Actuator 700 may be operably supported and attached to a plate 160 attached to leg 146 of U-shaped support 140. As shown in FIG. 18, actuator 700 may have a rotatable shaft 720 that extends though plate 160. Shaft 720 may be offset from the center of the body of actuator 700, and the portion of shaft 720 that attaches to wheel 710 may be disposed away from leg 146 of U-shaped support 140. A pair of springs 730 (only one of which is shown in FIG. 18) extends between support 520 and U-shaped support 140 to apply a compressive force on the carrier between wheel 710 and rotatable bearing 450 (FIG. 15) of ram assembly 410 (FIG. 15).

Figure 22:
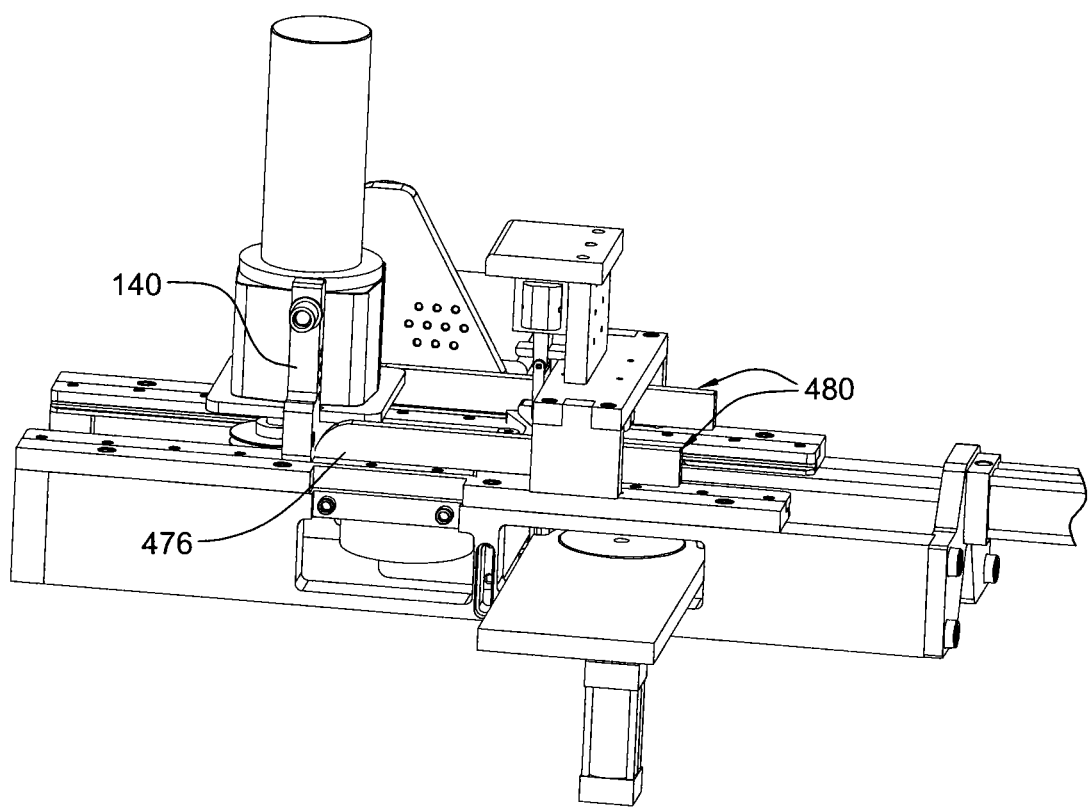
FIG. 22 is an enlarged perspective view of a portion of the induction heating apparatus of FIG. 1 illustrating the pusher assembly engaging the actuator for rotating the carrier and metal object.

With reference to FIG. 22, ends 476 and 478 (FIG. 14) of side pushers 480 are operable to engage the bottom portion of U-shaped support 140 to cause the U-shaped support, and thus the lower portion of actuator 700 and wheel 710 to pivot upwardly and allow carrier and the part to pass unobstructed underneath.

Figure 23:
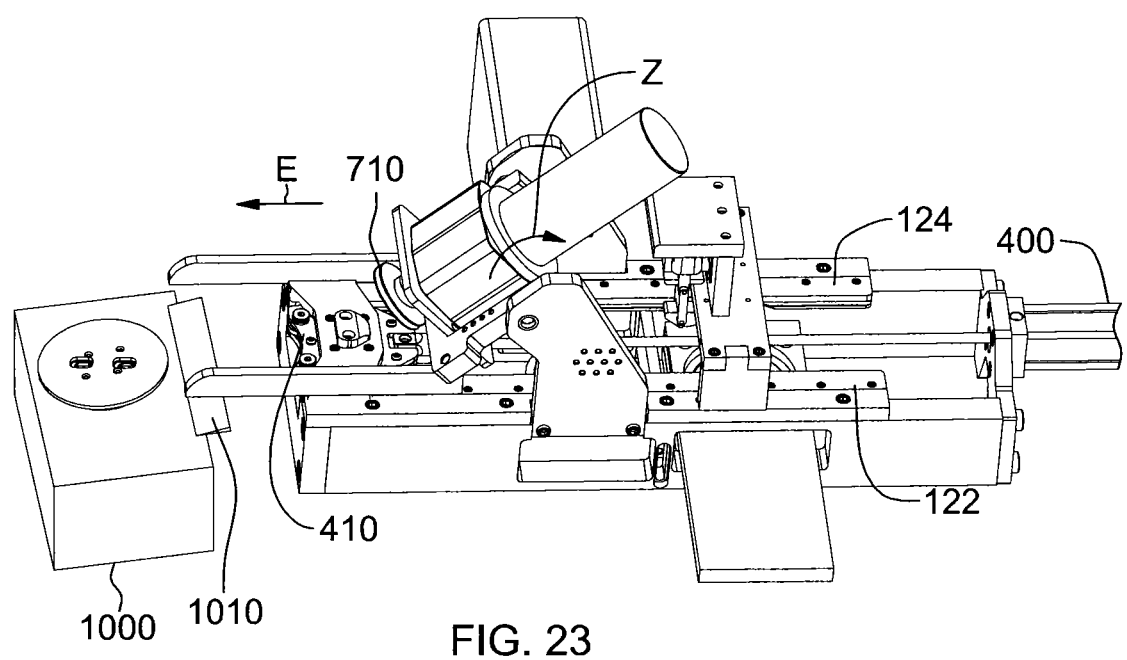
FIG. 23 is a perspective view of the induction heating apparatus of FIG. 1 illustrating the carrier and part being ejected after the induction heating process into a quench bath.

With reference again to FIG. 19, at the completion of rotation of the carrier and metal object and heating by the induction heating device, solenoid 530 of movable restrainer assembly 500 is actuated to move movable restrainer 510 upwardly to disengage from ram stop 490, thereby allowing actuator 400 (FIG. 1) and ram assembly 410 to force the carrier and the heated part in the direction of arrow E, as shown in FIG. 23, thereby causing wheel 710 and actuator 700 to be pivoted in the direction of curved arrow Z out of way from the continued movement of the carrier and heated part in the grooves in rails 122 and 124 at a generally high rate of speed and out of the support assembly and into a quench bath 1000 disposed adjacent to the end of the support assembly. In addition, actuator 400 and ram assembly 410 may be controlled, via the controller, to move the carrier and metal object with a first force applied by the ram assembly to locate the carrier and metal object adjacent to the coil. While the carrier is restrained by movable restrainer 510, actuator 400 and ram assembly 410 may be controlled, via the controller, to apply a second force on the ram assembly, for example, when the carrier is being rotated above the induction heating device. The second force may be greater than the first force. The larger second force may be operable to more quickly move the carrier and metal object once the movable restrainer is moved upwardly compared to the moving the carrier and metal object with the first force.

A deflector 1010 may be operably disposed at the end of the support to deflect the ejected carrier and heated part downwardly into the quench bath. This may allow the heated part to be introduced into the quench bath faster than the part falling under the force of gravity by itself into the quench bath, i.e., the part would fall faster that if simply dropped into a quench bath.

Figure 24:
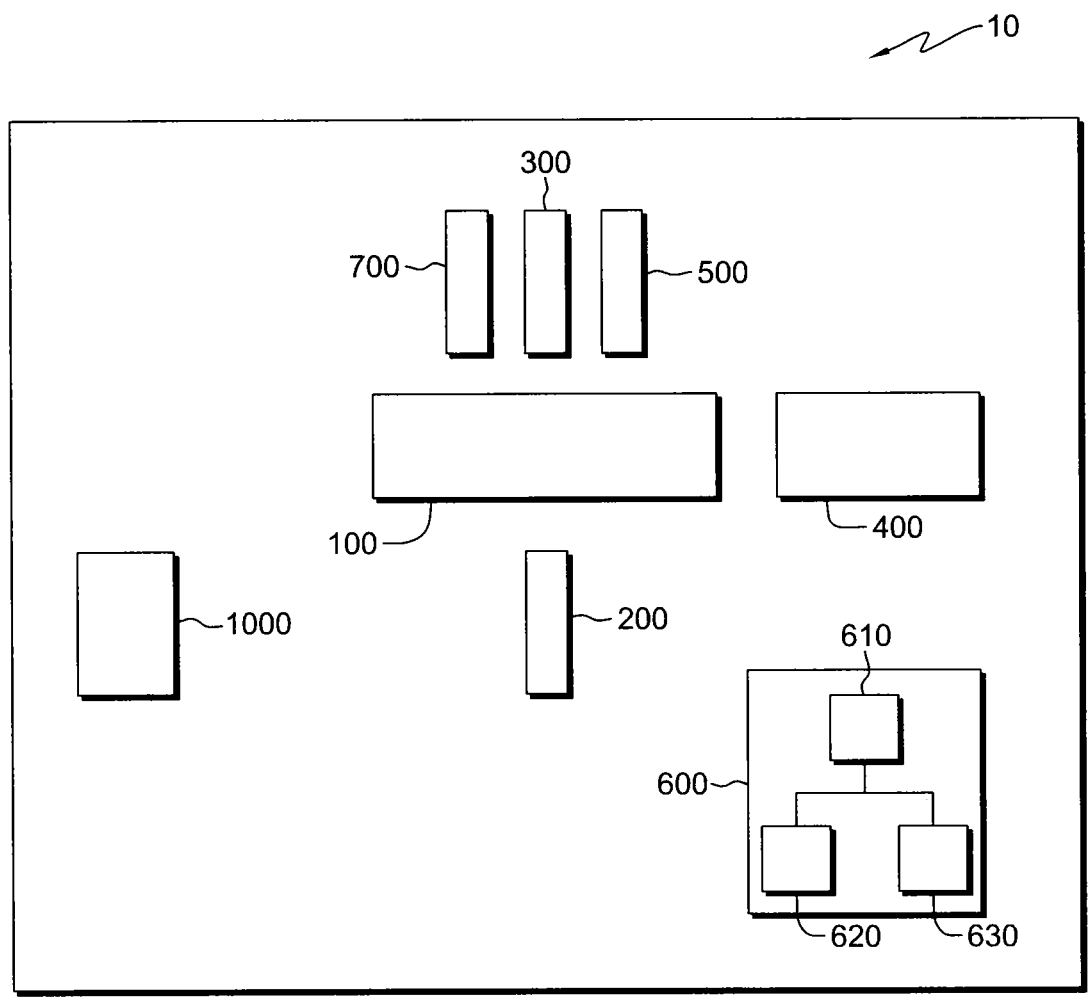
FIG. 24 is a block diagram of the induction heating apparatus of FIG. 1.

FIG. 24 is a block diagram of induction heating apparatus 10 which includes support assembly 100, actuator assembly 200, induction heating device 300, actuator assembly 400, movable restrainer assembly 500, controller 600, and actuator assembly 700. Controller 600 may include a logic chip, a microcontroller, or a processor 610, and a memory 620 operably connected to the processor, and one or more input/output devices 630.

Figure 25:
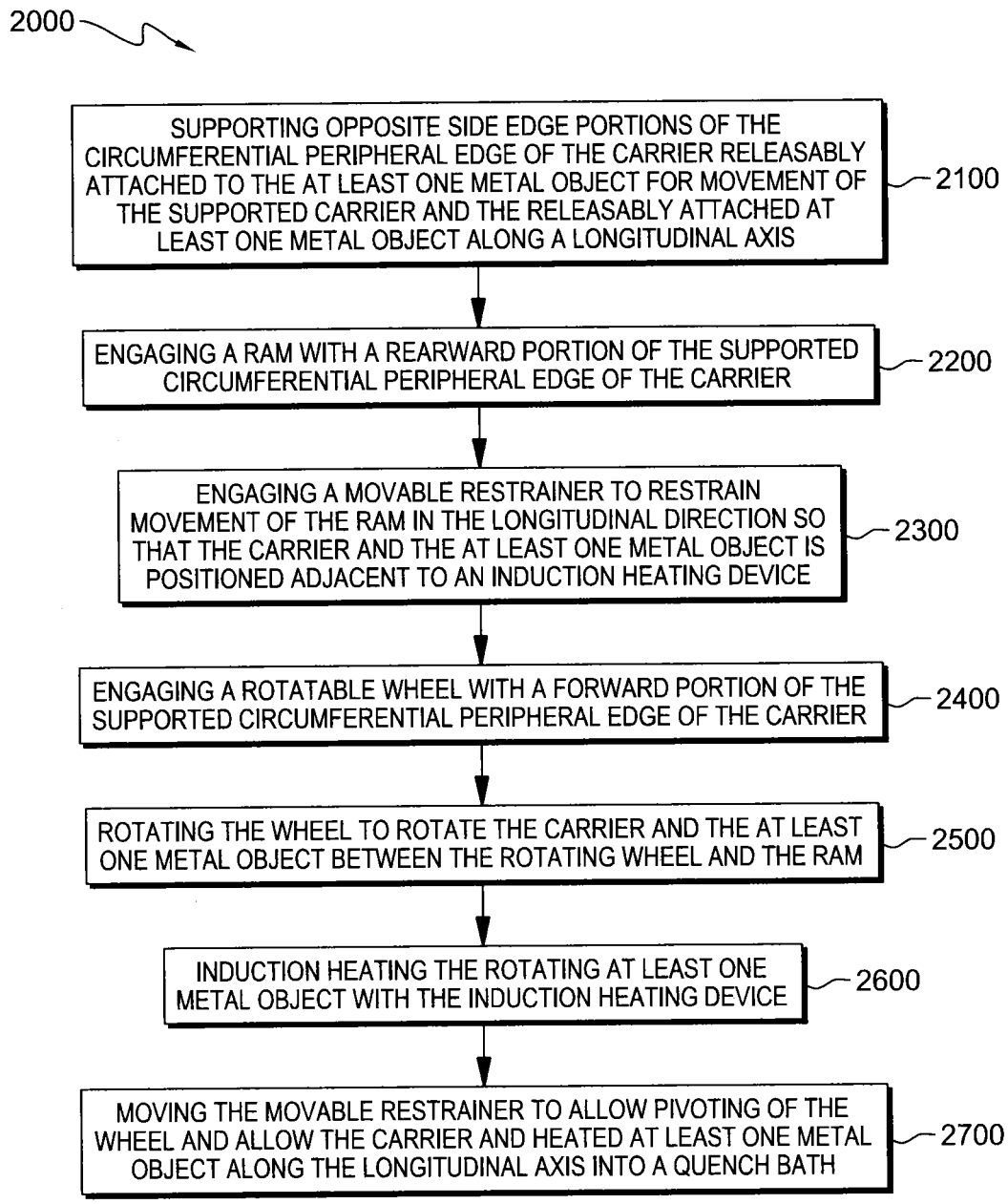
FIG. 25 is a flowchart of a method for induction heating at least one metal object releasably attached to a carrier in accordance with the present disclosure.

FIG. 25 illustrates a method 2000 for induction heating at least one metal object releasably attached to a carrier in which the carrier has a circumferential peripheral edge method 3000 includes, at 2100, supporting opposite side edge portions of the circumferential peripheral edge of the carrier releasably attached to the at least one metal object for movement of the supported carrier and the releasably attached at least one metal object along a longitudinal axis, at 2200, engaging a ram with a rearward portion of the supported circumferential peripheral edge of the carrier, and at 2300, engaging a movable restrainer to restrain movement of the ram in the longitudinal direction so that the carrier and the at least one metal object is positioned adjacent to a induction heating device. At 2400, a rotatable wheel is engageable with a forward portion of the supported circumferential peripheral edge of the carrier, and at 2500, the wheel is rotated to rotate the carrier and the at least one metal object between the rotating wheel and the ram. At 2600, the rotating at least one metal object is induction heated with the induction heating device. At 2700, then movable restrainer is moved to allow pivoting of the wheel and allow the carrier and heated at least one metal object along the longitudinal axis into a quench bath.

In additional aspects of the present disclosure, as noted above include the actuator indexing the carrier and metal object into the heat treat position under low pressure where it contacts the rotating friction wheel that starts the carrier and metal object spinning. The rotatable bearings of the ram assembly allow the second actuator to apply force to the carrier while still allowing it to rotate above the induction heating device. In addition, the coil may be energized, and the pressure on the actuator and ram may also be increased.

As soon as the induction heating cycle is complete, a signal is sent to the movable restrainer and solenoid actuated to release the movable restrainer so that the carrier and heated part is sent shooting out of the induction heating apparatus and directly into the quench tank within a fraction of a second after the induction hardening cycle is completed.

The quench tank may be equipped with rails that line up with the rails of the induction heating apparatus and directs the carrier and heated metal object into the quench medium faster than gravity would by itself. These rails may also guide the carrier and heated part into an eject location where another actuator or air cylinder (not shown) slowly lifts the carrier and heat treated metal object out of the quench medium after a desired length of time in the quench and drops it off into a bin.

Once the carrier and heat treated part is released or ejected from the induction heating apparatus and into the quench tank, the induction heating apparatus repeats the entire cycle with another carrier and part to be heat treated or as long as there is a carrier and part present in the magazine such as a magazine for automatically feeding a carrier attached to a metal part. As noted above, the carrier is presented over the induction heating device with the carrier and attached metal part held in position while the carrier is rotated in a plane parallel to the induction heating device for the few seconds that the induction heating device is energized to heat the parts, and then the carrier and heated part is accelerated into the quench tank or bath. For example, the carrier and metal part may be rotated over the energized coil for about 1 second to about 10 seconds, about 2 seconds to about 6 second, about 3 second to about 5 seconds, or about 3 or 4 seconds. After heating the part, the ejection of the carrier and heated part into the quench bath may be about 1 second, or less than 1 second. For example, the ejection of the carrier and heated part into the quench bath may be less than or about 0.5 second, less than or about 0.3 second, less than or about 0.2 second, or less than or about 0.1 second. The ejection of the carrier and heated part into the quench bath may be between about 0.1 second and 0.2.

From the present disclosure, the induction hardening may be employed to selectively harden surfaces of various steel parts, and afford faster presentation and quicker insertion into the quench media than available with conventional induction heating systems. The technique of the present disclosure allows quenching quickly that less heating time may be needed to austenitize the parts. The carrier may not be sufficiently affected so that it survives numerous heating and quenching cycles with little detriment. With the arrangement of parts in a circular pattern a number of parts can be hardened simultaneously for a given production cycle time.

It is to be understood that the above description is intended to be illustrative, and not restrictive. For example, the above-described embodiments and/or aspects thereof may be used in combination with each other. In addition, many modifications may be made to adapt a particular situation or material to the teachings of the various embodiments without departing from their scope.

While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled.

In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the disclosure has been described in detail in connection with only a limited number of embodiments, it should be readily understood that the disclosure is not limited to such disclosed embodiments. Rather, the disclosure can be modified to incorporate any number of variations, alterations, substitutions, or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

This written description uses examples in the present disclosure, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method for induction heating a plurality of metal objects, the method comprising:
    providing a holder secured to the plurality of metal objects;
    positioning the holder secured to the plurality of metal objects adjacent to an induction heating device;
    rotating the holder secured to the plurality of metal objects adjacent to the induction heating device;
    induction heating the rotating plurality of metal objects with the induction heating device so that the rotating plurality of metal objects move through an induction field for generally uniform heating of the plurality of metal objects; and
    moving the holder secured to the plurality of heated metal objects into a quench bath.

2. The method of claim 1 wherein the holder is operable for holding the plurality of metal objects arranged in a circular pattern.

3. The method of claim 1 wherein the holder comprises a disc-shaped member having a peripheral edge portion having a peripheral edge.

4. The method of claim 1 wherein the holder comprises a plurality of cutouts for receiving the plurality of metal objects.

5. The method of claim 1 wherein the holder comprises a generally disc-shaped member comprising a plurality of cutouts for receiving the plurality of metal objects disposed in spaced apart relationship along a peripherally-extending portion of the disc-shaped member.

6. The device of claim 5 wherein the plurality of cutouts is arranged in a circular pattern.

7. The method of claim 1 wherein the holder comprising a retaining plate.

8. The method of claim 7 further comprising a bolt extendable through a hole in the retaining plate.

9. The method of claim 1 wherein the providing the holder comprises providing the holder secured to the plurality of metal objects so that the plurality of metal objects is arranged in a circular array.

10. The method of claim 9 wherein the induction heating device comprises an induction coil having a diameter, and the plurality of metal objects is arranged in the circular array about a diameter generally equal to the diameter of the induction coil.

11. The method of claim 1 wherein the plurality of metal objects comprises a plurality of keys for use with bearings.

12. The method of claim 1 wherein the holder comprises a peripheral edge portion.

13. The method of claim 12 further comprising supporting portions of the peripheral edge portion of the holder for movement of the supported holder secured to the plurality of metal objects adjacent to the induction heating device and into the quench bath.

14. The method of claim 13 wherein the supporting comprises supporting portions of the peripheral edge portion of the holder in grooves.

15. The method of claim 1 wherein the moving comprises ejecting under a force the holder secured to the plurality of heated metal objects into the quench bath.

16. The method of claim 1 wherein the moving comprise ejecting under a force the holder secured to the plurality of heated metal objects into the quench bath at a rate faster than the holder secured to the plurality of heated metal objects falling by itself under the force of gravity.

17. The method of claim 1 further comprising restraining under a force the holder secured to the plurality of metal objects adjacent to the induction heating device while rotating the plurality of heated metal objects, and releasing the restrained holder secured to the plurality of heated metal objects so that the force moves the holder secured to the plurality of heated metal objects into the quench bath.

18. The method of claim 1 wherein the moving comprises deflecting the holder secured to the plurality of heated metal objects into the quench bath.

19. The method of claim 1 wherein the moving comprises moving the holder a secured to the plurality of heated metal objects into the quench tank in about 0.1 second to about 0.2 second after induction heating the plurality of metal objects.

20. The method of claim 1 wherein the induction heating comprises induction heating only surface portions of the plurality of metal objects.

21. A method for induction heating a plurality of metal objects, the method comprising:
    simultaneously rotating a plurality of metal objects through an induction field to generally uniformly heat the plurality of metal objects; and
    simultaneously moving the plurality of heated metal objects into a quench bath.

22. The method of claim 21 wherein the simultaneously rotating comprises simultaneously rotating the plurality of metal objects in a circle through the induction field to generally uniformly heat the plurality of metal objects.

23. The method of claim 21 wherein the plurality of metal objects is arranged in a circular array.

24. The method of claim 23 wherein the simultaneously rotating the plurality of metal objects comprises simultaneously rotating the plurality of metal objects through the induction field resulting from an induction coil having a diameter, and the plurality of metal objects is arranged in the circular array about a diameter generally equal to the diameter of the induction coil.

25. The method of claim 21 wherein the plurality of metal objects comprises a plurality of keys for bearings.

26. The method of claim 21 wherein the simultaneously moving the plurality of heated metal objects comprises ejecting under a force the plurality of heated metal objects into the quench bath.

27. The method of claim 21 wherein the simultaneously moving the plurality of heated metal objects comprises ejecting under a force the plurality of heated metal objects into the quench bath at a rate faster than the plurality of heated metal objects falling by itself under the force of gravity.

28. The method of claim 21 wherein the simultaneously rotating the plurality of metal objects through the induction field comprises restraining under a force the plurality of metal objects in the induction field, and the simultaneously moving the plurality of heated metal objects into the quench bath comprises operably releasing the restrained plurality of heated metal objects so that the force moves the plurality of heated metal objects into the quench bath.

29. The method of claim 21 wherein the simultaneous moving the plurality of heated metal objects into the quench bath comprises deflecting the plurality of heated metal objects into the quench bath.

30. The method of claim 21 wherein the simultaneous moving the plurality of heated metal objects into the quench bath comprises simultaneous moving the plurality of heated metal objects into the quench bath in about 0.1 second to about 0.2 second after induction heating the plurality of metal objects.

31. The method of claim 21 wherein the simultaneously rotating the plurality of metal objects through the induction field comprises simultaneously moving the plurality of metal objects through the induction field to generally uniformly heat a surface portion of the plurality of metal objects.

32. A method for induction heating a plurality of metal objects, the method comprising:
- simultaneously moving a plurality of metal objects through an induction field to generally uniformly heat the plurality of metal objects;
- simultaneously moving the plurality of heated metal objects into a quench bath; and
- wherein the simultaneously moving the plurality of heated metal objects comprises ejecting under a force the plurality of heated metal objects into the quench bath at a rate faster than the plurality of heated metal objects falling by itself under the force of gravity.

33. A method for induction heating a plurality of metal objects, the method comprising:
- simultaneously moving a plurality of metal objects through an induction field to generally uniformly heat the plurality of metal objects;
- simultaneously moving the plurality of heated metal objects into a quench bath; and
- wherein the simultaneously moving the plurality of metal objects through the induction field comprises restraining under a force the plurality of metal objects in the induction field, and the simultaneously moving the plurality of heated metal objects into the quench bath comprises operably releasing the restrained plurality of heated metal objects so that the force moves the plurality of heated metal objects into the quench bath.

* * * * *